Sept. 2, 1924.

C. G. HARRIS 1,507,481

NUT LOCK

Filed Sept. 22, 1922

C. G. Harris
INVENTOR
BY Victor J. Evans
ATTORNEY

Patented Sept. 2, 1924.

1,507,481

UNITED STATES PATENT OFFICE.

COURTLEY G. HARRIS, OF PARIS, ILLINOIS.

NUT LOCK.

Application filed September 22, 1922. Serial No. 589,803.

*To all whom it may concern:*

Be it known that I, COURTLEY G. HARRIS, a citizen of the United States, residing at Paris, in the county of Edgar and State of Illinois, have invented new and useful Improvements in Nut Locks, of which the following is a specification.

This invention relates to a lock nut which is mainly designed for use on large nuts, the general object of the invention being to provide a member which will interlock with the nut with means for holding the member against rotary movement, thus preventing the turning of the nut.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
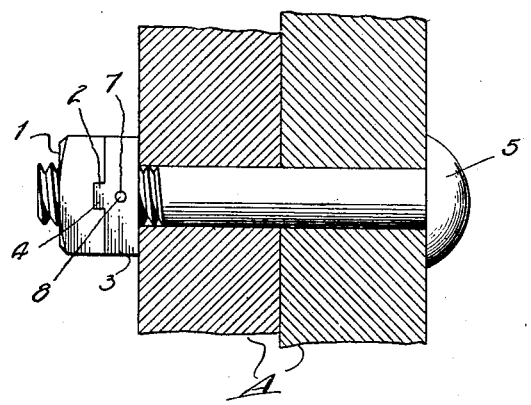
Figure 1 is a view showing the invention in use.
Figure 2:
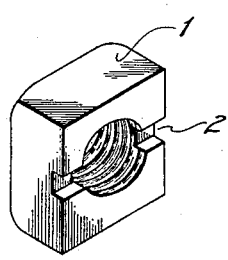
Figures 2 and 3 are detail views of the several parts.
Figure 3:
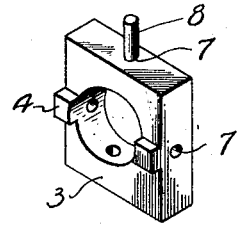

In these views 1 indicates the nut which is provided with notches 2 on its under side. 3 indicates the locking member which is provided with the tongues 4 for engaging the notches. This member has its opening of greater diameter than the bolt 5 so that it can be moved freely on said bolt. It is also provided with a hole 7 on each side for receiving a locking pin 8. In using the device the locking member is placed over the bolt and then the nut is screwed on the bolt until it approaches the work piece A. The locking member is then placed with its tongues in the notches and the nut screwed home so that the locking member is clamped between the nut and the work piece. One or more pins is then inserted in the holes in the locking member for holding the same against turning movement. The pins are forcibly driven into the holes so that they will expand under the force of the blows to frictionally hold the locking member against the threads of the bolt. Thus the nut will be locked against rotary movement so that there is no danger of the same working loose.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A lock nut of the class described comprising a nut having a notch in its under face, a locking member having a tongue for engaging the notch and a locking pin in the member for holding the same against movement.

2. A lock nut of the class described comprising a nut having notches in its under face, a locking member having tongues for engaging the notches, the opening in the said member being of greater diameter than the bolt, holes in the member and a locking pin for engaging one of said holes.

In testimony whereof I affix my signature.

COURTLEY G. HARRIS.